US005237646A

United States Patent [19]
Bunce

[11] Patent Number: 5,237,646
[45] Date of Patent: Aug. 17, 1993

[54] PIXEL IMAGE ENHANCEMENT EMPLOYING A REDUCED TEMPLATE MEMORY STORE

[75] Inventor: Richard W. Bunce, Boise, Id.

[73] Assignee: Hewlett-Packard Company, Palo Alto, Calif.

[21] Appl. No.: 960,993

[22] Filed: Oct. 13, 1992

[51] Int. Cl.$^5$ .................................. G06K 15/00
[52] U.S. Cl. ............................. 395/117; 382/54
[58] Field of Search ............ 395/101, 105, 109, 117, 395/157; 382/54, 30, 44, 46, 45, 48; 358/447, 448

[56] References Cited

U.S. PATENT DOCUMENTS

| | | | |
|---|---|---|---|
| 3,573,789 | 4/1971 | Sharp et al. | 340/324 |
| 4,437,122 | 3/1984 | Walsh et al. | 358/166 |
| 4,450,483 | 5/1984 | Coviello | 358/166 |
| 4,658,428 | 4/1987 | Bedros et al. | 382/54 |
| 4,847,641 | 7/1989 | Tung | 346/154 |
| 5,005,139 | 4/1991 | Tung | 364/519 |

Primary Examiner—Arthur G. Evans

[57] ABSTRACT

A method for enhancing reproduction of pixel images includes the steps of: storing a raster scan bit map of an image; selecting an input window from the bit map image that includes a plurality of row segments of bits representing pixels, the input window having a center pixel bit; comparing a subset of bits in the input window (that includes the center pixel bit) with a plurality of prediction bit subsets, each prediction subset represented in a plurality of rotation orientations, and upon finding a match with one of the prediction bit subsets, rotating the input window to the degree and direction indicated by a command associated with a matching prediction subset (if any); comparing the rotated input window with a limited set of sample windows to determine a match of certain bit states within the rotated input window with certain bits of a stored sample window; and upon determining that such a match exists, substituting an enhanced pixel representation for the center pixel bit of the input window.

10 Claims, 8 Drawing Sheets

PIXEL IMAGE ENHANCEMENT EMPLOYING A REDUCED TEMPLATE MEMORY STORE

FIELD OF THE INVENTION

This invention relates to a pixel image enhancement technique and, more particularly, to a method for enhancing pixel images employing prestored pixel image templates.

BACKGROUND OF THE INVENTION

A variety of printers are designed to create a printed image by printing a series of picture elements (pixels) on a print medium such as paper. Laser printers, which are a form of electrophotographic printer, create an image by scanning a laser beam across a charged surface of a photosensitive drum in a succession of raster scan lines. Each scan line is divided into pixel cells and the laser beam is modulated such that pixel cells are either exposed or not exposed depending upon the particular image being printed. Wherever a pixel cell is illuminated by the laser beam, the photosensitive drum is discharged and may then be toned in the known manner.

In laser printers, a bit map memory typically includes a digitized quantized image of a desired analog image. As such it consists of a large number of discrete pixels organized in a predetermined raster pattern. The ultimate resolution of an image produced by a laser printer is dependent upon the number of pixels printed per inch. However, even with a high pixel count level of resolution, diagonal lines and boundaries between different regions of an image appear as jagged steps or staircase distortion that is visible to the human eye.

The prior art references have considered methods for improving pixel image resolution. In U.S. Pat. No. 3,573,789 to Sharp, a 3×3 pixel cell subset is sequentially stepped across a bit map and, at each step, a central pixel is modified in accordance with the logic states of each of eight surrounding pixels. The central pixel may be printed as either a full pixel or as a quarter, half, or three quarter pixel.

U.S. Pat. No. 4,437,122 to Walsh et al., describes a similar nine pixel subimage but enhances the center pixel by selectively energizing one or more of nine subpixels contained within the center pixel. A table search is performed to match a prestored pixel image with an input pixel image. Among the prestored pixel images are rotated versions (90°, 180°, and 270°) of the basic prestored pixel image. If a match is found, it is known that the center pixel is to be modified by turning on (or off) one or more of the nine subpixels within the center pixel.

U.S. Pat. No. 4,450,483 to Coviello performs similar pixel subimage matching as is taught by Walsh et al., however Coviello decides only whether to modify the entire center pixel, rather than substituting for it, a set of subpixels.

U.S. Pat. No. 4,847,641 to Tung, assigned to the same assignee as the application, also enhances the printing of bit-map images by matching of pixel subimages with predetermined, stored templates or patterns to detect occurrences of preselected bit map features. Whenever a match occurs, a signal is generated to produce a corrected pixel that replaces a center pixel in the pixel subimage. The stored pixel templates represent pixel configurations that are common to all bit map images and are compiled into a matching table.

Figure 1:
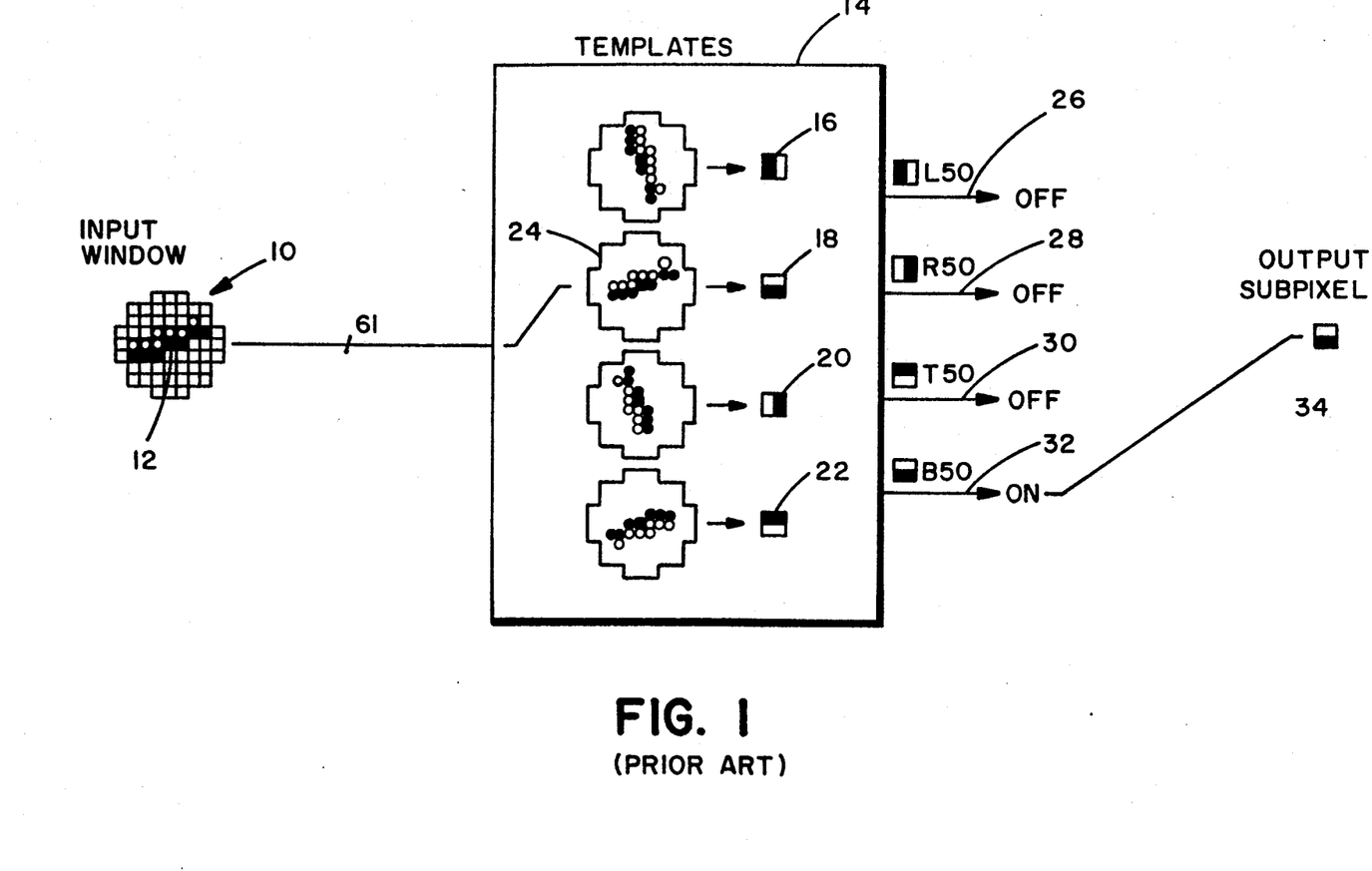
FIG. 1 is a schematic diagram illustrating a prior art window/template matching procedure used by prior art pixel image enhancement systems.

Referring to FIG. 1, the logic employed by Tung to achieve an output subpixel is illustrated. An input pixel window 10 comprising a matrix of cells (with edges eroded) is accessed from a pixel bit map. Center pixel 12 is the pixel that will be altered, (if necessary), based upon a comparison of input window 10 with a plurality of templates stored in a template store 14. A circle in a pixel cell illustrates a white pixel, a black circle illustrates a black pixel, and each cell that has neither a white or black circle is a "don't care".

In the Tung system, input window 10 is fed to a template store 14 and is compared with a plurality of templates. The templates are stored in a nonrotated version, and in rotated versions at 90 degrees, 180 degrees, and 270 degrees. Associated with each stored template is a subpixel control indication which causes a laser printer to produce one of subpixels 16, 18, 20 or 22, depending upon which template is found to match input window 10. In the case shown in FIG. 1, input window 10 matches template 24 thereby resulting in output lines 26, 28, and 30 being in the OFF state and output line 32 in the ON state. The ON state of output line 32 signals a laser controller in the laser printer to print output subpixel 34. More specifically, output line 32 causes the laser printer to substitute output subpixel 34 for center pixel 12 to achieve an improved edge representation. The pixel outputs on lines 26, 28, 30 and 32 are indicated as L50 (i.e. left 50 percent of the pixel is ON), R50 (i.e. right half of the pixel is ON), T50 (i.e., top of the pixel is ON) and B50 (i.e. bottom of the pixel is ON).

In carrying out the Tung procedure, hundreds of templates are provided. Many of the templates are rotated and/or mirror image versions of fundamental templates. Thus, there is considerable redundant information in the rotated templates within the Tung memory. However, such information is required to detect all orientations of the particular input image distortion that each fundamental template was designed to detect.

Accordingly, it is an object of this invention to provide an improved pixel resolution enhancement method that employs reduced template storage.

It is another object of this invention to provide an improved resolution enhancement system for a pixel image representation which is rapid in execution and employs minimal prestored comparison templates.

SUMMARY OF THE INVENTION

A method for enhancing reproduction of pixel images includes the steps of: storing a raster scan bit map of an image; selecting an input window from the bit map image that includes a plurality of row segments of bits representing pixels, the input window having a center pixel bit; comparing a subset of bits in the input window (that includes the center pixel bit) with a plurality of prediction bit subsets, each prediction subset represented in a plurality of rotation orientations, and upon finding a match with one of the prediction bit subsets, rotating the input window to the degree and direction indicated by a command associated with a matching prediction subset (if any); comparing the rotated input window with a limited set of sample windows to determine a match of certain bit states within the rotated input window with certain bits of a stored sample window; and upon determining that such a match exists, substituting an enhanced pixel representation for the center pixel bit of the input window.

DETAILED DESCRIPTION OF THE INVENTION

Figure 2:
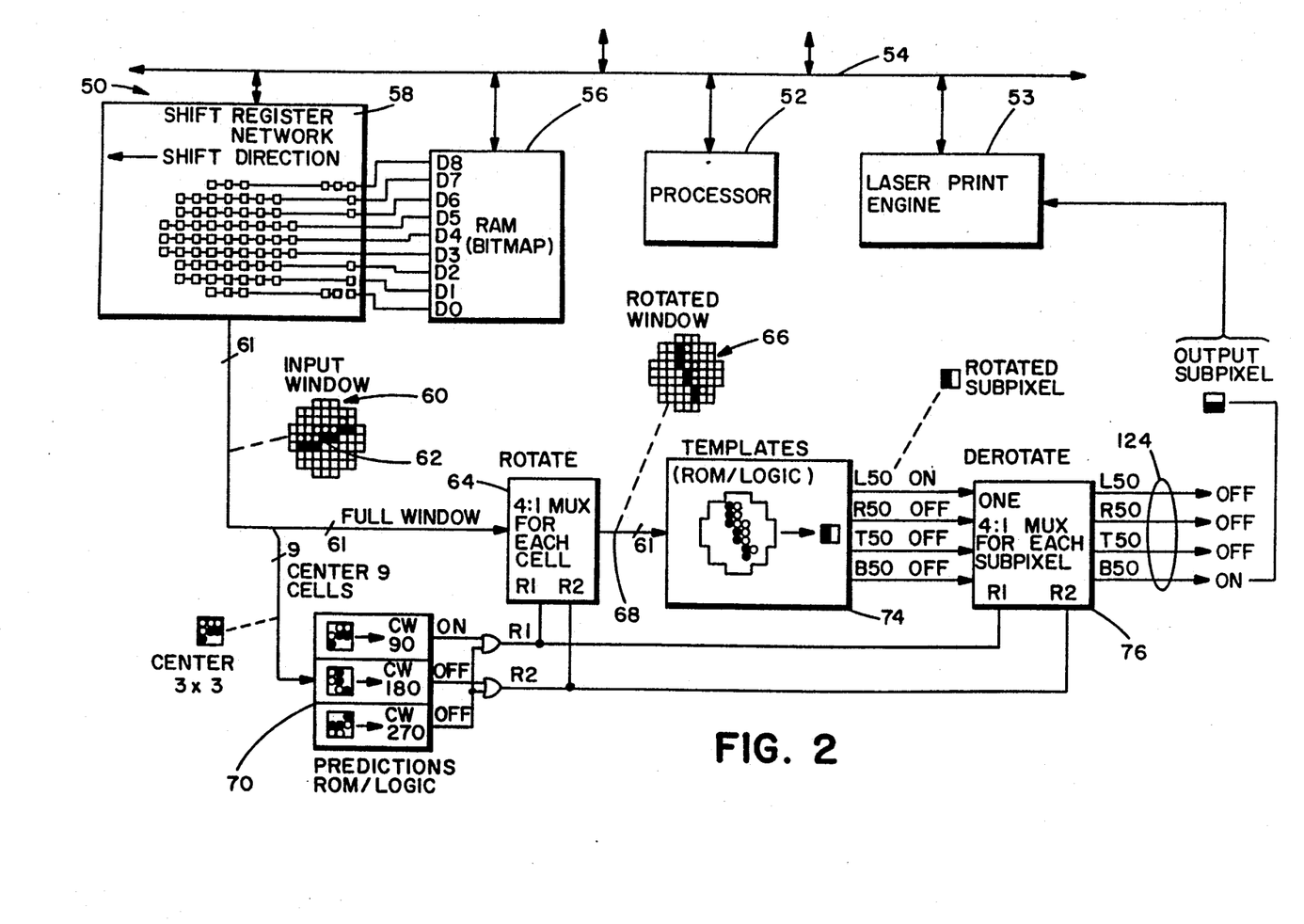
FIG. 2 is a block diagram illustrating the invention.

Referring to FIG. 2, portions of a laser printer 50 are illustrated that are involved in performing the pixel image enhancement method of the invention. A processor 52 controls the overall operation of the system, including laser print engine 53, via communications on bus 54. Interconnections between bus 54 and the remaining portions of the system are shown, only in part, to avoid overcomplication of the view. A random access memory (RAM) 56 stores a pixel bit map image which is to be enhanced in accordance with the invention. The bit map image is well known in the art and comprises a plurality of raster scan rows of ones and zeroes, representing the individual pixel states in the bit map image.

A shift register network 58 is controlled by processor 52 to sequence an input window across the bit map in RAM 56. Circuitry comprising shift register network 58 is known in the art and may be found illustrated in U.S. Pat. Nos. 4,847,641, 4,437,122, referred to above. In essence, shift register network 58 outputs a series of contiguous row segments of the raster bit map image stored within RAM 56, hereafter, referred to as an "input window" (illustrated as 60 in FIG. 2).

The objective of the circuit of FIG. 2 is to determine whether center pixel 62 in input window 60 should remain unchanged, or modified so as to better represent the pixel image present in input window 60. During the course of the operation of the circuit shown in FIG. 2, input window 60 is incremented across the entire bit map stored in RAM 56 so that every bit position therein becomes a center pixel 62 and is subjected to the logical treatment to be hereinafter described.

Figure 3:
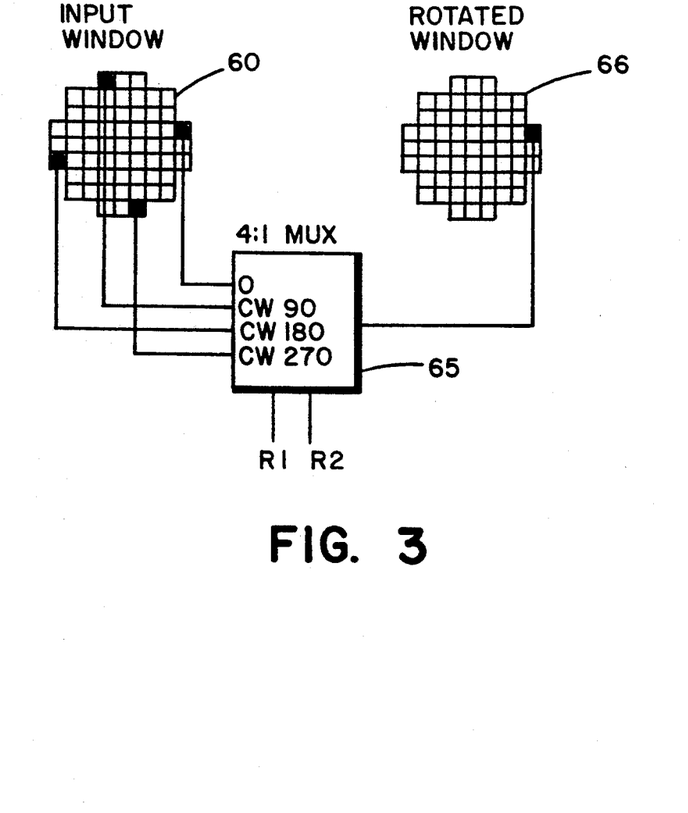
FIG. 3 illustrates the action of rotate module 64 in FIG. 2.

Input window 60, as fed from shift register network 58, is applied to a rotate module 64. Rotate module 64 comprises one 4:1 multiplexer for each pixel cell in input window 60. As input window 60 includes 61 cells (in this example), rotate module 64 comprises 61 multiplexers, with each multiplexer having four inputs and one output. Each one of the four inputs to a multiplexer represents one of four possible cell positions that a pixel can have if input window 60 is rotated zero degrees (no rotation), 90 degrees, 180 degrees, or 270 degrees. As shown in FIG. 3, four cell positions in input window 60 are connected as inputs to a multiplexer 65 in rotate module 64. The bit state in each cell position is fed as an input to multiplexer 65, and in accordance with control inputs R1, R2, one of these bit states is fed as an output and becomes the bit state of a "rotated" window 66. By appropriately controlling each multiplexer, input window 60 can thus be "rotated" by causing each of the multiplexers within rotate module 64 (e.g. 61 in number) to select a rotated cell position input for connection to its output terminal.

Figure 4:
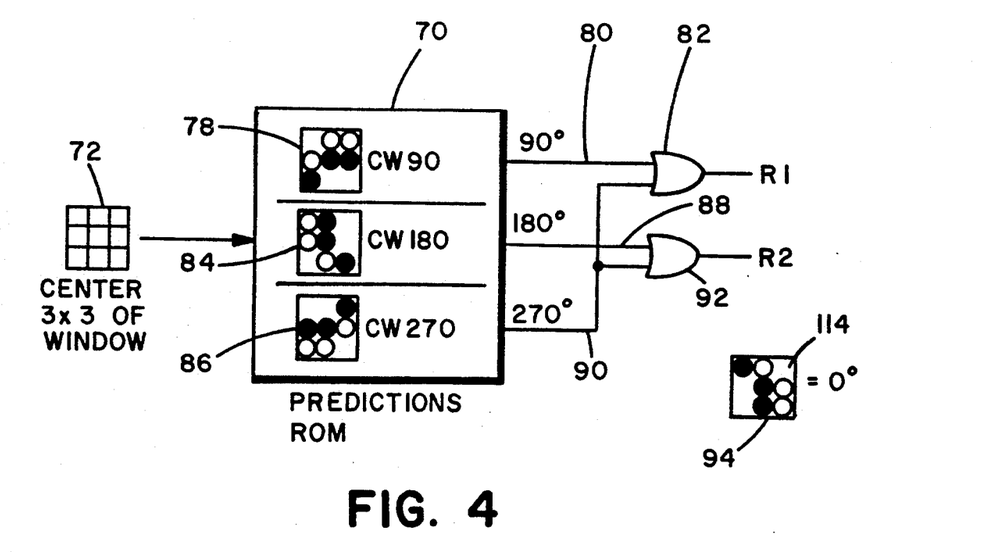
FIG. 4 is an expanded view of prediction ROM/logic block 70 of FIG. 2.

Rotate module 64 is controlled by outputs from a predictions ROM/logic module 70 that is in turn provided with inputs comprising the bit states of the center nine cells of input window 60. In FIG. 4, an expanded view of predictions module 70 is shown with center cell group 72 shown as an input thereto. Predictions module 70 includes a plurality of 3×3 prediction cell groups which, if encountered in an input center cell group of window 60, indicate a high likelihood that a comparison template will be encountered in template ROM/logic module 74, possibly in a rotated version (see FIG. 2).

A match between a prediction cell group and an input center cell group 72 in predictions module 70, causes a command to issue which indicates whether input window 60 should be rotated to match a template stored in templates module 74. This pre-rotation enables the number of templates stored in templates module 74 to be substantially reduced from that taught in the prior art. If a match is found between rotated window 66 and a template stored in template module 74, a center pixel alteration signal is provided which is subsequently derotated in a derotate module 76 so as to enable a proper center pixel modification signal to be produced and transmitted to laser print engine 53.

As above indicated, predictions module 70 contains a plurality of 3×3 prediction cell groups which, if matched by a center cell group from an input window 60 cause appropriate command signals to issue to rotate module 64. If, for example, center cell group 72 (FIG. 4) matches prediction cell group 78, a high output appears on output line 80 indicating that input window 60 should be rotated by 90° to match a template stored in templates module 74. That output is applied to OR circuit 82 causing output R1 to rise. Because center window 72 matches prediction cell group 78, (and as a result, cannot match prediction cell groups 84 or 86), output lines 88 and 90 remain at the low state. Thus, OR circuit 92 holds R2 to the low state, with the R1 and R2 states comprising command signals to rotate module 64.

The output levels manifest on R1 and R2, cause rotate module 64 to enable a second input to each multiplexer therein. A clockwise rotation of 90 degrees of the input window bit states in input window 60 is the result. By contrast, if a match was found between center cell group 72 and prediction cell group 84, the states of R1 and R2 would cause a third input of each of the multiplexers in rotate module 64 to be outputted onto line 68, etc. If, however, center cell group 72 matches prediction cell group 94, no rotation occurs, and the multiplexers in rotate module 64 provide a non-rotated output window onto lines 68.

Figure 5:
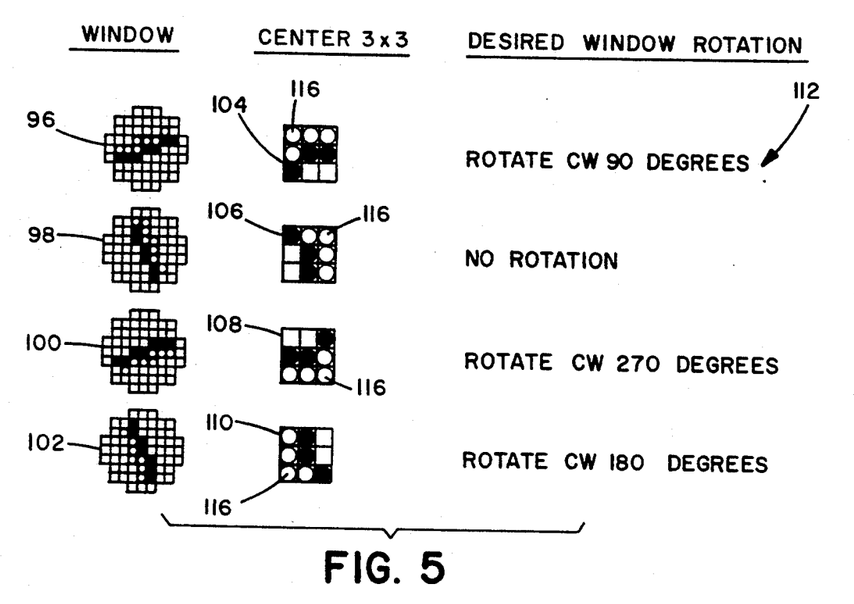
FIG. 5 illustrates exemplary input window configurations and their resultant window rotations based upon comparison with a prediction bit set.

In FIG. 5, further examples are given for an exemplary window input in four states of rotation 96, 98, 100 and 102. The resulting center 3×3 cell groups are shown at 104, 106, 108 and 110. If it is assumed that prediction cell group 94 (FIG. 4) is stored in predictions module 70 in the form of rotated versions 78, 84, and 86, outputs R1, R2 will cause the window rotations shown at 112 in FIG. 5. In this instance, it is important to realize that the upper right pixel position in prediction cell group 94 (FIG. 4) is a "don't care" cell 114. As a result, the fact that center cell groups 104, 106, 108, and 110 contain a zero bit 116 (in rotated states of that position) is ignored in the comparison process. Thus, center cell group 104 compares exactly to prediction cell group 78 and causes a rotate 90 degree clockwise output to be manifest by R1, R2. Similarly, a window such as 98 will cause no rotation to occur as it finds no match in any of prediction cell groups 78, 84, or 86. Similarly, center cell group 108 causes a 270 degree clockwise output and center cell group 110 causes a 180 degree clockwise output.

Figure 6:
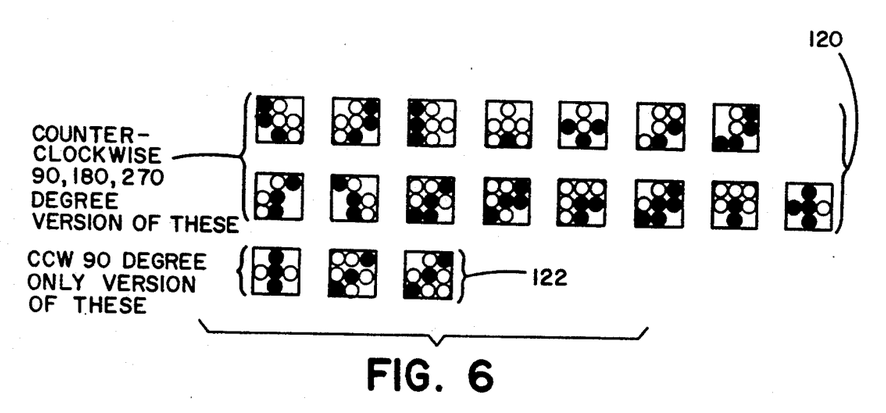
FIG. 6 illustrates the plurality of prediction bit sets stored in the predictions ROM/logic along with rotations thereof.

In FIG. 6, prediction cell groups stored in predictions module 70 are shown. They include counterclockwise 90°, 180° and 270° rotations of prediction cell groups 120. In addition, predictions module 70 includes counterclockwise 90° rotations of prediction cell groups 122. The effect of comparison actions in prediction module 70 is to enable input window 60 (FIG. 2) to be rotated to match a prestored template in templates module 74. Without predictions module 70 and rotate module 64, templates module 74 would require up to four rotated copies of each template to enable a proper subpixel correction value to be outputted. As a result, substantial memory is saved while enabling a very rapid comparison to occur between an input window and the templates stored in template module 74.

Once a comparison is made, templates module 74 produces an output indicative of an enhanced pixel representation to be applied to center pixel 62 of input window 60. Because the enhanced pixel representation may be rotated, it is applied to derotate module 76 where inputs R1 and R2 cause a derotation of the four possible outputs from templates module 74 and cause a derotated enhanced pixel representation to appear on one of output lines 124. In essence, derotate module 76 produces the exact complementary function that each of the multiplexers produce in rotate module 64. However, there are only four multiplexers in derotate module 76 whereas there are 61 in rotate module 64 (assuming an input window 60, as shown).

The output levels appearing on lines 124 from derotate module 76 are applied to a controller in laser print engine 53 which appropriately modulates the laser beam so as to create the output subpixel arrangement indicated. The specific modulation operation is described in U.S. Pat. No. 4,847,641 to Tung, assigned to the same assignee as is this application, the contents of which are incorporated herein by reference.

A further aspect of the invention is the determination of the reduced template set included in the template module 74 of FIG. 2. Selection of which original templates are included in the reduced template set, and which templates are discarded is based on the nature of the original template set and the characteristics of the invention's architecture. When an input window that matches a template of the original template set is present, it will be rotated based on its center cell group comparison to the prediction cell groups. In order for the rotated window to maintain a match, the original template must be rotated by the same degree and included in the reduced template set.

Figure 7:
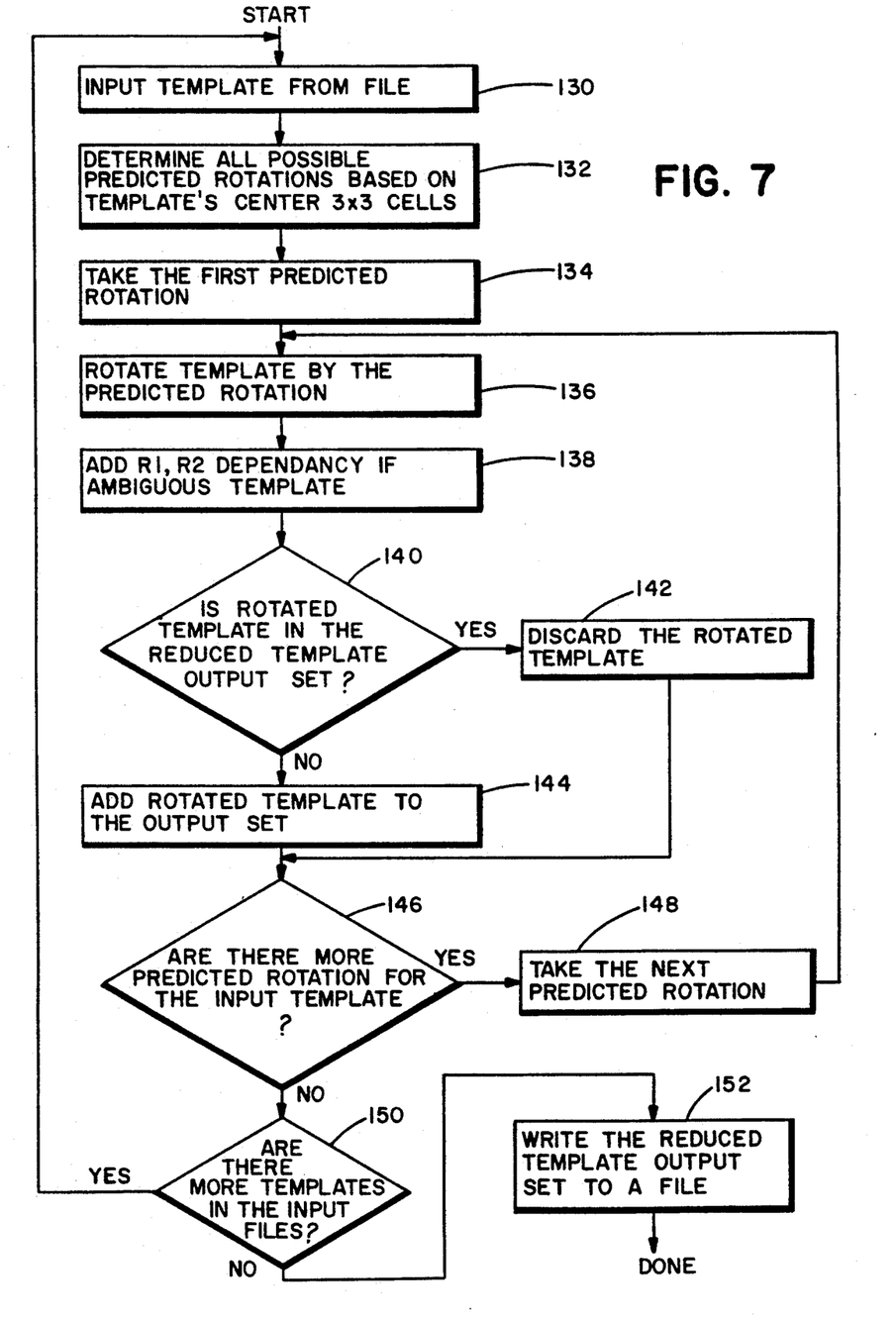
FIG. 7 is a logic flow diagram illustrating a procedure by which a reduced set of pattern matching templates are derived for insertion into a template ROM.

In FIG. 7, a procedure is illustrated that transforms an original set of pattern matching templates into a reduced set stored in templates module 74. The procedure determines, in advance, all possible input window rotations for all original template set matches. The finite number of templates, the small 3×3 prediction cell group size and the finite number of prediction cell groups makes an exhaustive test possible.

Initially, an input template is accessed from a file (box 130) and all possible predicted rotations are determined based upon the template center 3×3 cell group (box 132) (determined in combination with prediction cell groups in prediction module 70). The first predicted rotation is accessed (box 134) and the accessed template is rotated by the predicted rotation (box 136). If the accessed template is ambiguous, a rotation (R1, R2) dependency is added to the rotated template, as will be discussed below (box 138).

The current set of reduced templates is searched to see if the rotated template has already been included (decision box 140). If it has been included, the rotated template is redundant and can be discarded (box 142). If it has not been included, then the rotated template is added to the current set of reduced templates (box 144).

If there are additional predicted rotations for the accessed template that arise as a result of its comparison with prediction cell groups (decision box 146), the next predicted rotation is accessed (Box 148) and the procedure recycles back to box 136. If there are no more predicted rotations, it is determined whether there are templates still in the input file (decision box 150) and if yes, the procedure recycles. If there are no further templates, the current set of reduced templates is saved as the reduced template set for use in templates module 74.

Figure 8:
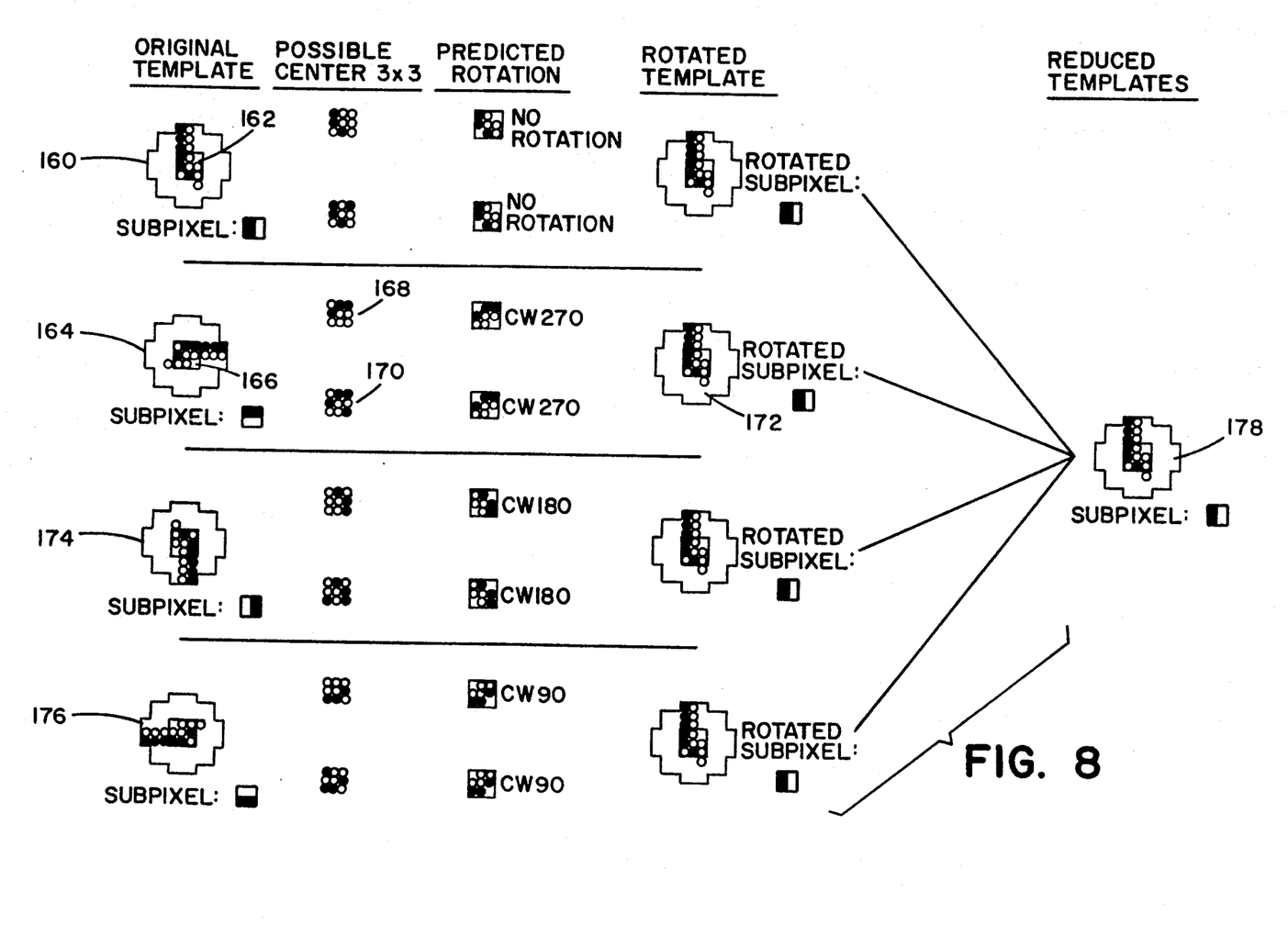
FIGS. 8-11 illustrate exemplary template inputs, showing how data reduction is achieved through the operation of the flow diagram of FIG. 7.

FIG. 8 shows four members of the original template set, all rotated variations of the same fundamental template. The first original template 160 has a don't care cell 162 in the upper right corner of the center cell group. Since an input window matching of this template can have either a black or white bit in this position, both possibilities are examined for their predicted rotations. Neither possible center cell group matches a prediction cell group, so input windows matching this template will not be rotated. A zero degree rotation of the template must be included in the reduced template set to match the input window.

The second original template 164 has a don't care cell 166 in the center cell group, and both possibilities are examined. Both possible center cell groups 168, 170 match a clockwise 270 degree prediction cell group, so the template is rotated clockwise 270 degrees (as an input window matching it would be). The rotated template 172 is seen to be identical to that of the first original template 160. In a similar fashion, the remaining two original templates (174, 176) each have two possible center cell groups that are examined, and are rotated (as matching input windows would be). Their rotated templates are also identical to that of the first original template 160. Only one instance of this rotated template 178 is needed in the reduced template set.

Figure 9:
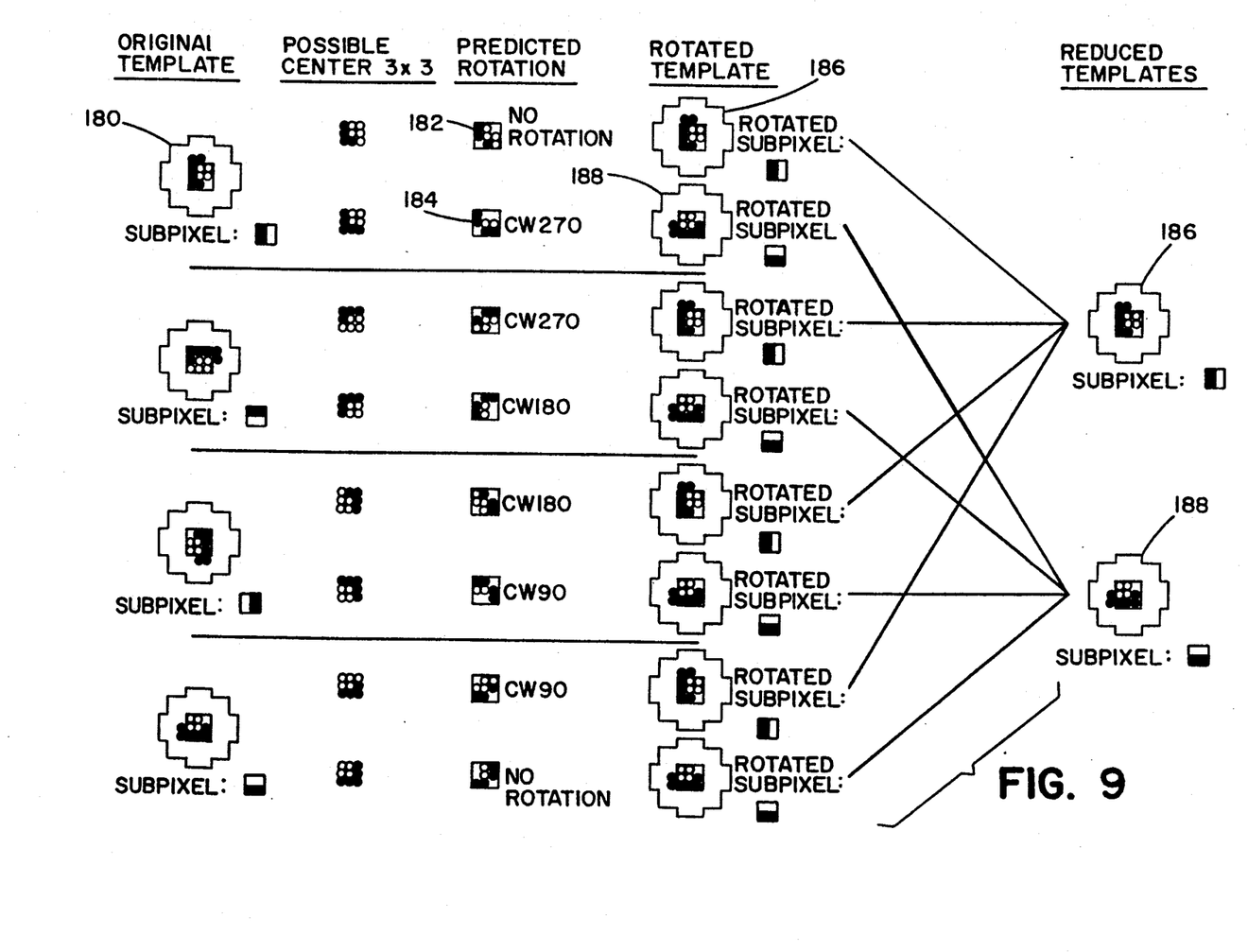

FIG. 9 shows four members of the original template set, all rotated variations of the same fundamental template, and all with one don't care bit in the center cell group. But when both possible center cell groups for the first original template 180 are examined, two different rotations 182, 184 are predicted. An input window with a white bit in the don't care position will not be rotated, so a zero degree rotation 186 of the original template 180 must be included in the reduced template set. But an input window with a black bit in the don't care position will have a center cell group that matches a clockwise 270 degree prediction cell group 184, and the window will be rotated clockwise 270 degrees. So a clockwise 270 degree rotation 188 of the original template must also be included in the reduced template set.

Examining the possible center cell groups for the remaining three original templates results in two different rotations for each, yielding a pair of rotated templates identical to the pair found for the first original template. Only one instance of each template in the pair is needed in the reduced template set.

Figure 10:
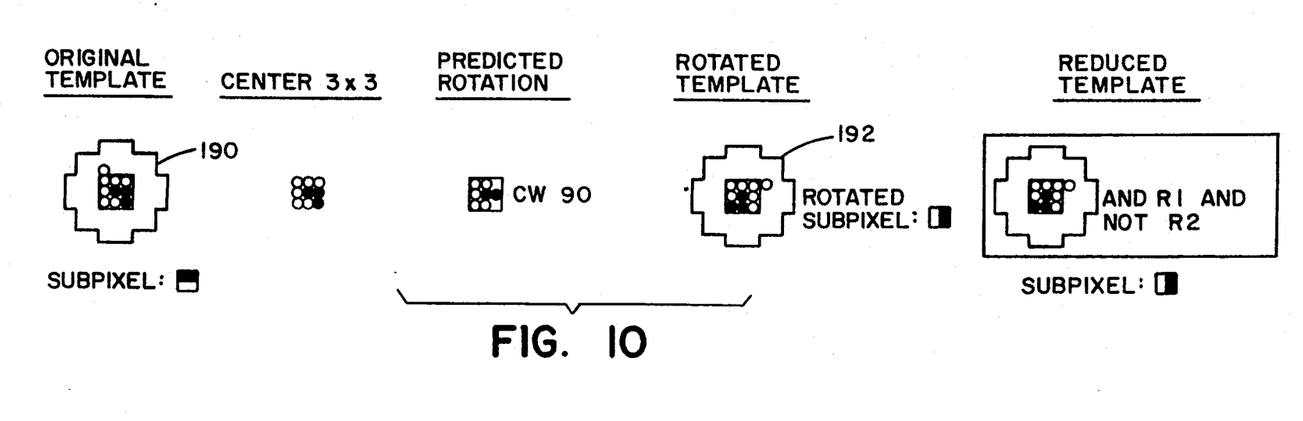
Figure 11:
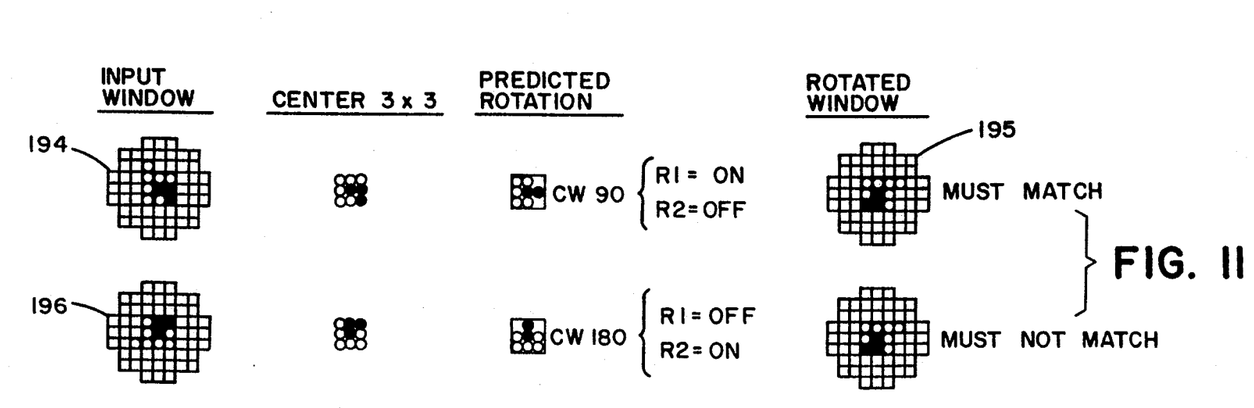

FIG. 10 shows an example of an original template set member 190 that has no rotated variations. Input windows matching this template will be rotated clockwise 90 degrees, so a clockwise 90 degree rotation 192 of the original template must be included. The first input window 194 shown in FIG. 11 matches the original template 190, and its rotated window 195 matches the rotated template 192. However, the second input window 196 does not match the original template 190, but its rotated window 197 is identical to that of the first input window 192. This would result in an erroneous template match. Original templates such as this are said to be ambiguous.

Ambiguous templates can be accommodated by adding a rotation dependency to the reduced template. If, in addition to matching the white and black cells defined in the reduced template, a rotated window is also required to have a particular rotation (state of R1 and R2 in FIG. 2) in order to match the reduced template, then erroneous template matches can be eliminated. Adding rotation dependency requires R1 and R2 inputs to the templates module (not shown in FIG. 2). Ambiguous templates are not reduced by, though not precluded from, this invention.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A system for enhancing reproduction of images represented by a plurality of pixels, said system comprising:

memory means for storing consecutive rows of a bit map image;

means for selecting a sample window of pixels from said bit map image in said memory means, said sample window of pixels comprising a plurality of row segments of bits representing said pixels, said sample window having a center bit representing a center pixel in said sample window;

prediction means for comparing a pixel cell group including said center pixel from said sample window with a plurality of prediction bit subsets, certain of said prediction bit subsets represented in a plurality of rotated orientations in said prediction means, and for further providing command signals indicative of a match of said pixel cell group with one of said prediction bit subsets;

means responsive to a signalled match for rotating said sample window of pixels in accordance with command signals associated with a matching prediction bit subset;

template means for comparing said rotated sample window of pixels with a plurality of stored sample windows to determine a presence of a match of selected bits within said rotated sample window with selected bits of a stored sample window; and correction means for generating a signal indicative of an enhanced pixel representation for said center pixel in response to a said determined match.

2. The system as recited in claim 1 wherein said means for rotating comprises a switching means for each pixel position in said sample window, said switching means operable to provide outputs that manifest a rotated sample window of pixels, in accordance with command signals from said prediction means.

3. The system as recited in claim 1 wherein said correction means receives an input from said template means that is indicative of a partial pixel representation, said correction means derotating said partial pixel representation to an orientation consistent with said sample window of pixels before rotation.

4. The system as recited in claim 3 wherein said means for rotating and said correction means respond to identical command signals to accomplish rotation and derotation actions.

5. The system as recited in claim 3 wherein said derotated partial pixel representation is provided as an output for modulating a laser print engine.

6. The system as recited in claim 5 wherein said correction means further comprises at least three switching means, each switching means connected so as to cause derotation of at least three possible partial pixel manifestations from said template means and to provide a properly oriented partial pixel representation for control of a laser print engine.

7. The system as recited in claim 6 wherein said rotation and correction means are both controlled by command signals from said prediction means.

8. The system as recited in claim 1 wherein said prediction means comprises a plurality of stored N×M prediction bit subsets, where N may or may not be equal to M, certain said subsets manifested in a plurality of orthogonal orientations with respect to each other.

9. A method for enhancing reproduction of images represented by a plurality of pixels, comprising the steps of:

(a) storing consecutive rows of a bit map image;

(b) selecting a sample window of initial orientation comprising a plurality of row segments of bits representing pixels from said bit map image, said sample window having a center pixel bit;

(c) comparing a pixel bit subset from said sample window that includes said center bit with a plurality of prediction bit subsets, some prediction bit subsets represented in a plurality of rotated orientations, and issuing a command that signals a match of said pixel bit subset with a prediction bit subset if such a match is found;

(d) rotating, if necessary, said selected sample window in accordance with a said command issued as a result of a found match with a prediction bit subset;

(e) comparing said rotated selected sample window with a plurality of stored sample windows to determine if a match exists between selected bits within said rotated selected sample window and identical selected bits of a stored sample window; and (f) responsive to a match being found, substituting an enhanced pixel representation for said center pixel.

10. The method as recited in claim 9, wherein said comparing and substituting steps (e) and (f) include the steps of:

manifesting a subpixel representation in conformance with a found matching stored sample window; and derotating, if necessary, said subpixel representation to conform with the initial orientation of said selected sample window.

* * * * *